United States Patent [19]

Herndon

[11] Patent Number: 5,338,204
[45] Date of Patent: Aug. 16, 1994

[54] METHOD AND APPARATUS FOR BICYCLE RIDING INSTRUCTION

[76] Inventor: John Herndon, 710 Cricketwood La., Charlotte, N.C. 28215

[21] Appl. No.: 80,756

[22] Filed: Jun. 22, 1993

[51] Int. Cl.⁵ .................. A63B 69/00; B62H 7/00
[52] U.S. Cl. .................... 434/247; 280/293; 280/301
[58] Field of Search ............ 434/247; 280/293, 301, 280/303

[56] References Cited

U.S. PATENT DOCUMENTS

| | | | |
|---|---|---|---|
| 642,144 | 1/1900 | Mellish | 280/303 |
| 3,650,544 | 3/1972 | Cassell | 280/293 |
| 3,746,367 | 7/1973 | Johannsen | 280/301 |
| 4,615,535 | 10/1986 | McMurtrey | 280/293 |
| 4,730,840 | 3/1988 | Goldmeier | 280/210 |
| 4,903,975 | 2/1990 | Weisbrodt et al. | 280/293 |
| 5,029,894 | 7/1991 | Willman | 280/755 |
| 5,100,163 | 3/1992 | Egley et al. | 280/293 |

Primary Examiner—Paul J. Hirsch
Assistant Examiner—Cindy A. Cherichetti
Attorney, Agent, or Firm—Shefte, Pinckney & Sawyer

[57] ABSTRACT

An apparatus and method for bicycle riding instruction includes at least two auxiliary wheels mounted to the bicycle and movable between a first, lowered position and a second, raised position and a control rod for imparting directional forces to the bicycle and for moving the auxiliary wheels between the raised and lowered positions, the method for bicycle riding instruction including the steps of controlling and guiding the movement of the bicycle with the auxiliary wheels lowered, moving the auxiliary wheels into a raised position while the bicycle is in motion, controlling and guiding the bicycle movement with the auxiliary wheels in the raised position, and, finally, removing the auxiliary wheels and controlling and guiding bicycle movement with the auxiliary wheels removed.

15 Claims, 5 Drawing Sheets

METHOD AND APPARATUS FOR BICYCLE RIDING INSTRUCTION

BACKGROUND OF THE INVENTION

The present invention relates generally to methods and interactive apparatus for assisting in the instruction of bicycle riders. More specifically, the present invention provides a method and apparatus to assist in systematically imparting necessary skills to a bicycle rider involving the selective use of auxiliary or "training" wheels, and manually controlling and guiding bicycle movement.

One of the more difficult rites of passage for most children is learning to ride a bicycle. Children typically begin riding tricycles which require no balance to operate and ultimately graduate to bicycles which require more skill, balance and coordination to ride. Bicycle operation requires the coordination of hand and foot movement, and general body control related to balance in keeping the bicycle moving in an upright disposition under rapidly changing balancing forces. The rider must learn to propel the bicycle using his feet to turn two cranks which rotate a sprocket. The constant up and down motion of the feet on the pedals cause balancing forces to shift from left to right during movement. Straight line movement of the bicycle is complicated by the necessarily steerable front wheel which is operable by using a handlebar pivotably mounted to the front wheel and capable of movement in either direction to control the bicycle's direction of movement. Further, change of direction can be achieved by leaning the bicycle to one side or the other combined with almost imperceptible handlebar movement. Again, balance and coordination are key to the successful operation of the bicycle. Typically, children's bicycles will have a braking system based on a so-called "coaster brake" which is operable by reversing the direction of the sprocket using the pedals. Balance and coordination are again necessary to bring the bicycle safely to a stop under the influence of braking forces.

Mastery of the above-discussed skills is an imposing task for a four- to five-year-old child. Too often the training wheels are removed from a bicycle before the child is ready and the child's pride can be hurt by having to reinstall training wheels which imparts a sense of failure. Further, given that some children are inherently more coordinated than others, children who are inordinately slow in acquiring the necessary skills to ride a bicycle can be socially traumatized by the experience of facing their friends and appearing awkward or even cowardly.

In addition, parents are often helpless in teaching their children the necessary skills. Verbal instruction is only partially effective in teaching a skill which is primarily a physical experience. Typically, parents will let the child operate a bicycle with training wheels for a transitional period between tricycles and bicycles, and then remove the training wheels to let the child suddenly find himself on his own. The parent must watch helplessly as the child careens down the street or sidewalk under very little control and perhaps falling over or veering off course. This experience can be very frustrating and painful for the child and nerve-racking for the parents. Most often, parents will have to hold onto the rider or the seat to guide the child down the street while the child acquires a sense of balance rolling upright on two wheels. However, this direct parental contact with the rider or the seat physically interferes with the child's control and movement of the bicycle and can impart instability and imbalance. If the child starts from an imbalanced position or the parent pushes the child in an unbalanced manner, the rider will be attempting to initially gain balance control and will have little sense of what proper bicycle motion feels like.

Accordingly, there is a need for an interactive device to allow the bicycle to be controlled by an instructing parent in a balanced and directive manner, and to provide the selective use of auxiliary wheels. Further, there is a need for a method to provide progressive removal of auxiliary support to a rider until the rider is sufficiently skilled to operate a bicycle safely on his own.

SUMMARY OF THE INVENTION

It is accordingly an object of the present invention to provide an interactive device which allows a parent to provide balanced and stabilized control of a bicycle and to progressively lessen the degree of control until the child is capable of unaided bicycle operation. It is further an object of the present invention to provide an apparatus to allow the selective use of auxiliary wheels and to direct, control and stabilize bicycle movement during the training process. It is another object of the present invention to provide a method for using such a device to actively involve the parents in teaching a child to ride in a balanced and non-interfering manner that inspires confidence in a young rider.

According to the preferred embodiment of the present invention, an apparatus for bicycle riding instruction is mountable to a conventional bicycle frame and operable by an instructor to guide and control the actions of the bicycle and includes an auxiliary wheel support assembly having at least two auxiliary wheels mounted thereto and being constructed and arranged for selectively controlled movement between a first, lowered position at which the auxiliary wheels are closely adjacent the ground for helping to maintain the bicycle in an upright disposition and a second, raised position at which the wheels are spaced from the ground sufficiently to have no effect in keeping the bicycle in an upright disposition, and a control arrangement connected to the support assembly and the bicycle frame, the control arrangement being operable to selectively move the auxiliary wheel support assembly between the first and second positions and to control the actions of the bicycle.

Preferably, the control arrangement includes a generally rod-like member pivotably mounted to the bicycle frame rearwardly of the seat and projecting outwardly therefrom, the rod member being operably connected to the auxiliary wheels, and the auxiliary wheel support assembly, and thereby the wheels, being movable between the first and second positions responsive to movement of the rod member. It is preferred that the rod member be pivotable between a first predetermined position wherein the wheels are in the lowered position and a second predetermined position wherein the auxiliary wheels are in the raised position. The first predetermined position of the rod member is preferably rearwardly of the second predetermined position. The rod member has a hand grip mounted to the outward end thereof for gripping by a non-rider to control the actions of a bicycle, including acceleration, deceleration, speed and direction of movement.

It is preferred that the auxiliary wheel mounting assembly include a mounting bracket having a first portion mountable to the bicycle frame to project outwardly therefrom and a second portion, hingedly mounted to the first portion and projecting outwardly therefrom, the first portion being selectively pivotable generally upwardly relative to the second portion, in response to movement of the rod member. Further, a latching arrangement is provided to selectively latch the second bracket portion in a non-movable disposition. The latching arrangement preferably includes a generally planar latch plate pivotably mounted to the first bracket portion and configured to extend between the first bracket portion and the second bracket portion to selectively prevent upward movement of the second bracket portion, the latch plate being connected to the rod member and movable responsive to movement thereof. Movement of the rod member causes the latch plate to move away from the second bracket portion and further causes the second bracket portion, and thereby the auxiliary wheel, to move upwardly relative to the first bracket portion.

It is preferred that the auxiliary wheel support assembly include an arrangement for removably mounting the support assembly to the bicycle frame independently of the rod member so that the rod member can be used to control the actions of the bicycle without the influence of the auxiliary wheels, the rod member being fixable to the frame in a non-pivotable manner.

According to the preferred method of the present invention, the above-described apparatus is mounted to the frame of a conventional bicycle. The actions of the bicycle are controlled and guided using the control arrangement with the wheels in the first, lowered position. The control arrangement may be gripped by an instructor to impart acceleration, deceleration, speed and directional movement to the bicycle. Responsive to apparent rider skills indicating sufficient bicycle riding skills relative to operating the bicycle in an upright disposition, the auxiliary wheels are moved to the second, raised position. The actions of the bicycle are then controlled and guided using the control arrangement with the auxiliary wheels in the second, raised position. Optionally, and responsive to an apparent lack of rider skills, the auxiliary wheels may be moved to the lowered position. Finally, and in response to apparent rider skills being sufficient to control the bicycle without the auxiliary wheel support, the auxiliary wheels are then removed while retaining the control arrangement. The control arrangement is then used to guide and control the actions of the bicycle with the auxiliary wheels removed from the bicycle frame.

DETAILED DESCRIPTION OF THE PREFERRED EMBODIMENT

Figure 1:
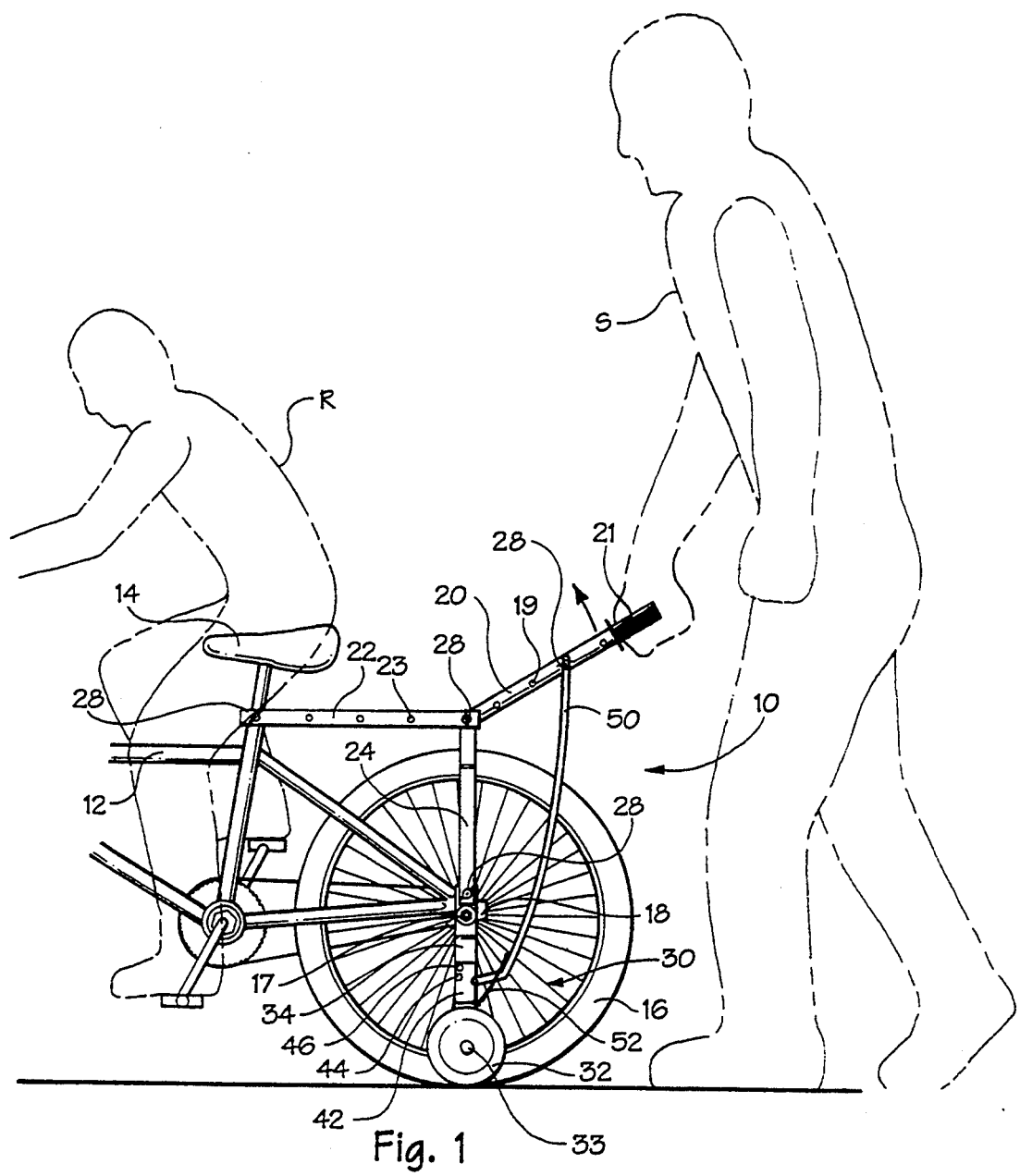
FIG. 1 is a side view of an apparatus for bicycle riding instruction according to the preferred embodiment of the present invention, mounted to a bicycle frame with the auxiliary wheels in their lowered position.

Referring now to the accompanying drawings, and particularly to FIG. 1, an apparatus for bicycle riding instruction is shown generally at 10 and is mounted to a conventional bicycle frame 12 at a position rearwardly of the bicycle seat 14. The bicycle riding instruction apparatus 10 generally includes an auxiliary wheel assembly 30, a control rod 20, connecting rods 50, and a plurality of mounting brackets 22,24 for mounting the bicycle riding instruction apparatus to the bicycle frame 12. It is to be understood that the drawings show only a left side view of the bicycle, but the auxiliary wheel assembly 30, the connecting rods 50, and the mounting brackets 22,24 are duplicated on the right side of the bicycle frame 12 as well.

Figure 2:
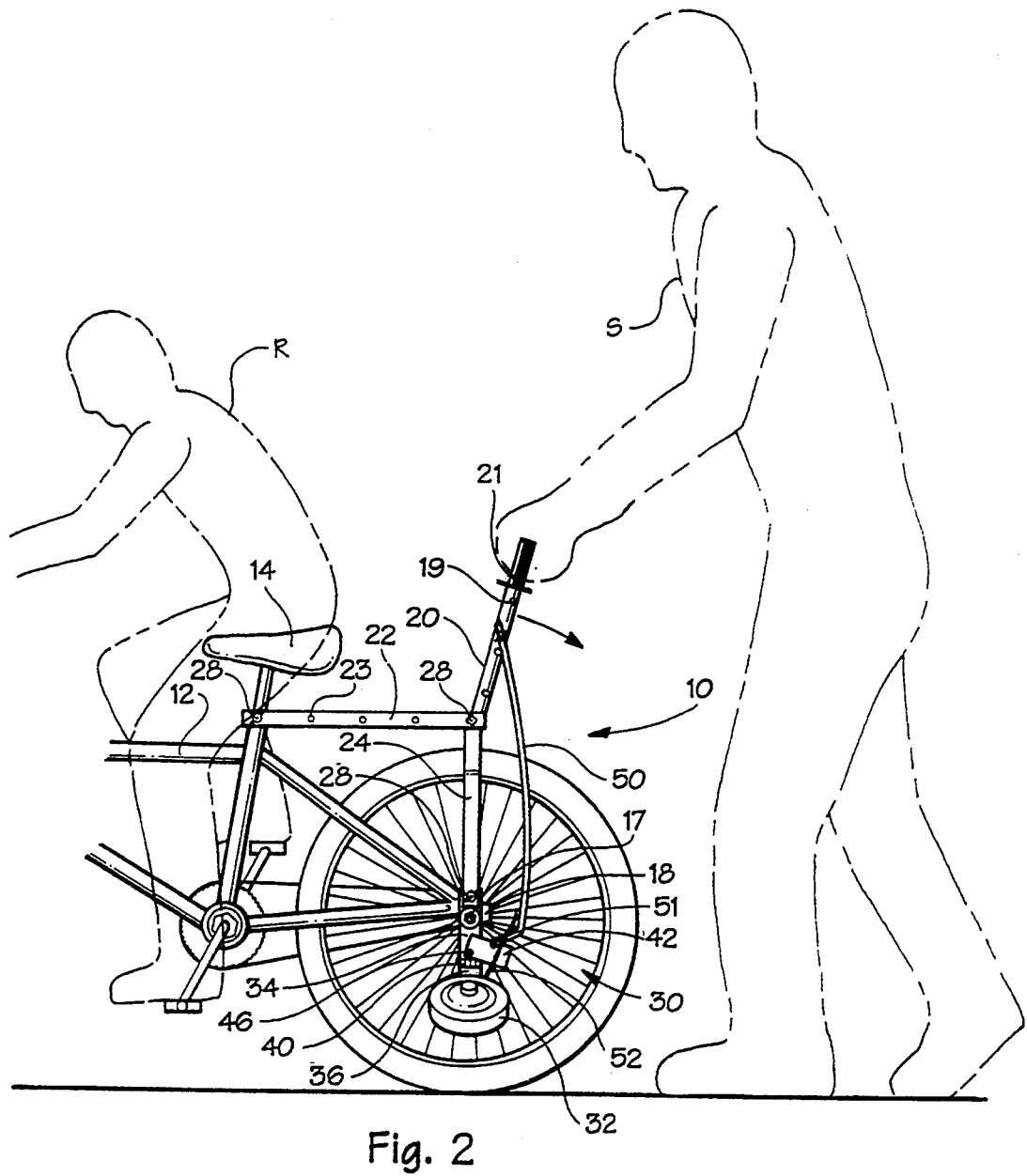
FIG. 2 is a side view of the apparatus shown in FIG. 1 with the auxiliary wheels in the raised position.
Figure 3:
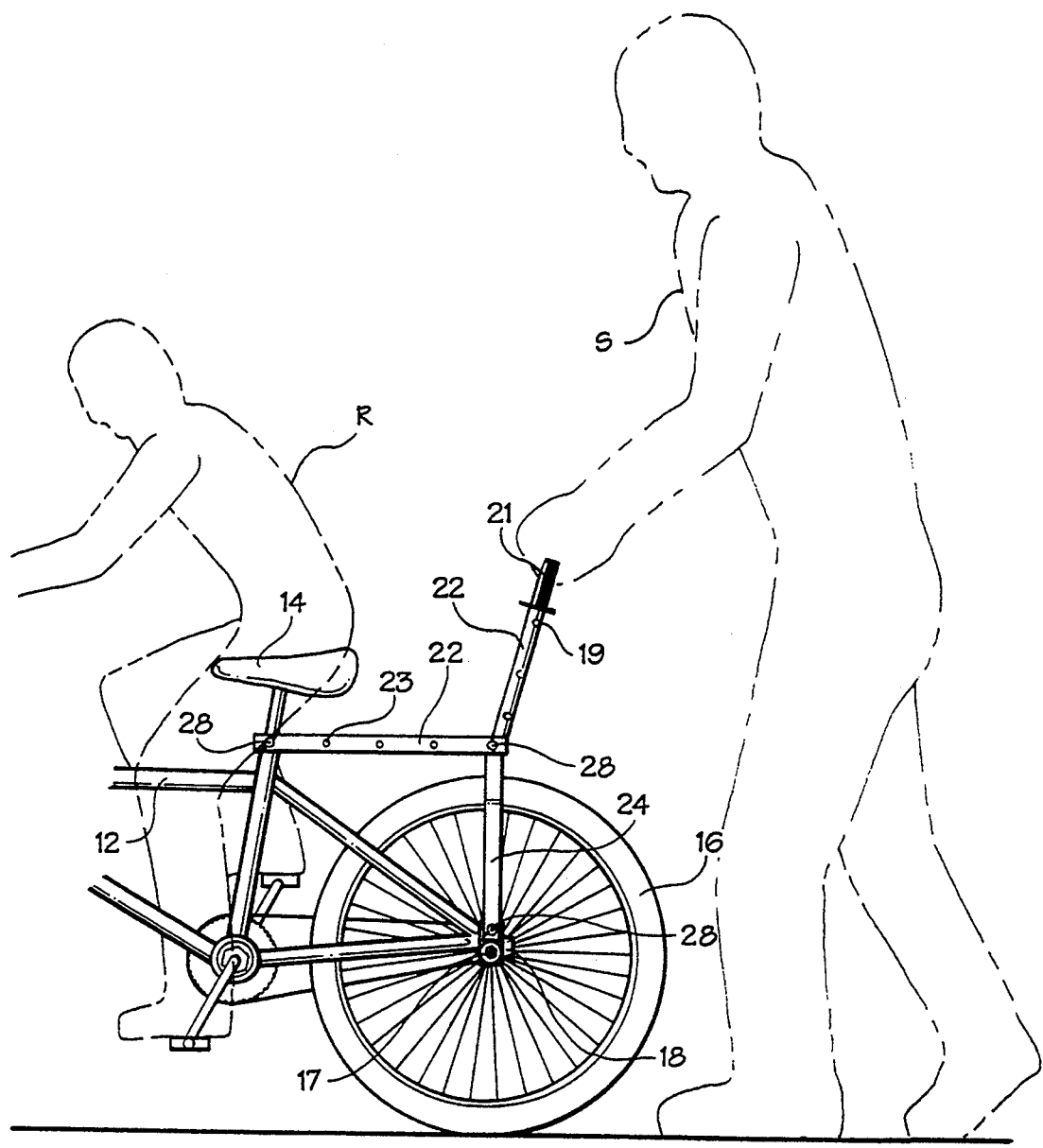
FIG. 3 is a side view of the apparatus of FIG. 1 with the auxiliary wheels removed.
Figure 4:
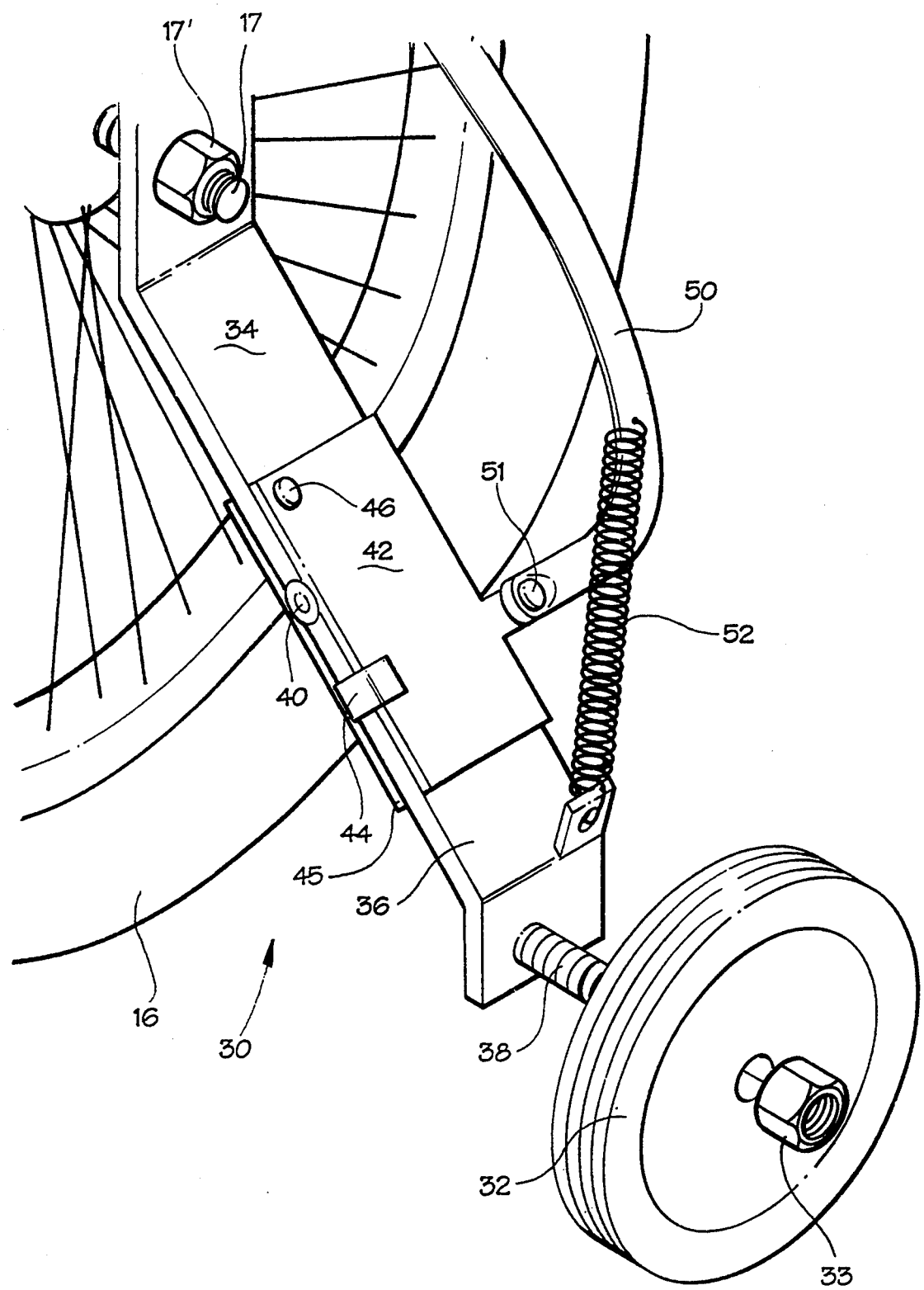
FIG. 4 is a detail view of the auxiliary wheel positioning mechanism of the present invention.

The auxiliary wheel assembly 30 basically includes a pair of auxiliary wheels 32 which are mounted to the bicycle frame 12 adjacent the rear wheel and tire assembly 16 using a mounting assembly 30' projecting outwardly and downwardly from the rear axle 17 of the bicycle, as best illustrated in FIG. 4. The auxiliary wheel mechanism 30 is configured for controlled movement between a first, lowered position as shown in FIG. 1 and a second, raised position as shown in FIG. 2. With reference to FIG. 4, the auxiliary wheel mounting assembly 30' includes a first bracket portion 34 formed as a generally planar plate having a hole formed in one end through which the bicycle axle 17 is fitted. The first bracket portion 34 is retained on the axle 17 by a conventional bolt 17'. Immediately below the bicycle axle 17, the first bracket position 34 diverges outwardly and downwardly for a predetermined distance where it is hingedly fixed to a second generally planar bracket portion 36 using a hinge 40. The second bracket portion 36 normally extends in a coplanar manner with the first bracket portion 34 in a direction generally downwardly, and the lowermost end of the second bracket portion 36 is spaced from the ground a distance corresponding generally to the radius of the auxiliary wheel 32. The lowermost end of the second bracket portion 36 diverges generally vertically downwardly and an axle 38 is mounted thereto so as to project generally horizontally outwardly therefrom. A backing plate 45 is formed as a generally planar member and is mounted to the underside of first bracket portion 34 to extend outwardly therefrom beneath the second bracket portion which abuts the backing plate 45 when the wheels 32 are in the lowered position to maintain said first bracket portion 34 and said second bracket portion 36 in generally linear alignment. An auxiliary wheel 32 is mounted to the axle using a conventional bolt 33. The overall effect of the mounting bracket portions 34,36 is to provide an auxiliary wheel 32 in spaced parallel relation with the bicycle wheel and tire assembly 16 at a position wherein the relatively smaller diameter auxiliary wheel 32 may be selectively placed in a position for contact with the ground for auxiliary stabilization of the bicycle in an upright rolling disposition.

A latch plate 42 is provided to maintain the bracket portions 34,36 linearly aligned against the backing plate 45 and to prevent the second bracket portion 36 from pivoting on the hinge 40 in response to ground contact by the auxiliary wheel 32. The latch plate 42 is a generally planar member pivotably mounted to the first bracket portion 34 adjacent the hinge 40, the latch plate 42 being laterally pivotable at an upper corner thereof and attached to the first bracket portion 34 using a pivot pin 46. A generally L-shaped stop member 44 is attached to one side of the second bracket portion 36 to extend upwardly and partially thereover to provide a spacing between the second bracket portion 36 and the latch member 44 into which the latch plate 42 may fit. In this manner, the second bracket portion 36 is prevented from pivoting upwardly by abutment against the latch plate 42 positioned against the stop member 44. The second bracket portion 36 is prevented from pivoting further downwardly by its abutment with the backing plate 45.

With reference to FIGS. 1 and 2, the auxiliary wheels 32 are movable between the lowered and raised positions in response to movement of the control rod 20 as will be explained in greater detail hereinafter. The control rod 20 is mechanically connected to the auxiliary wheel assembly 30 using a pair of generally rigid connecting rods 50, only one of which is visible in the drawings. Each connecting rod 50 is formed as a curved elongated member and is mounted to the latch plate 42 using a pivot pin 51 for controlling lateral pivotal movement of the latch plate 42 in and out of latching position. A generally rectangular flange 37 projects upwardly from the second bracket portion 36 and a control spring 52 extends from the flange 37 to the control rod 50 for operative movement of the second bracket portion 36 as will be explained in greater detail hereinafter.

Referring now to FIG. 1, the control rod 20 is formed as a generally cylindrical shaft having a plurality of openings 19 formed at spaced positions along the longitudinal extent thereof to provide adjustability in mounting the control rod 20 to the bicycle, as will be explained in greater detail hereinafter. A hand grip 21 which may be foam, rubber or other gripping material is mounted to the outward end portion of the control rod 20 for gripping by an instructor S. The control rod 20 is mounted to the bicycle frame 12 using two pairs of brackets 22,24, one bracket in each pair being visible in the drawings. The upper brackets 22 are formed as generally planar narrow strips of aluminum, steel or other rigid material and include a plurality of bolt openings 23 formed at spaced positions along the longitudinal extent thereof. One end of the upper bracket 22 is mounted to the bicycle frame 12 at the outward extent of the seat receiving tube 12'. The upper brackets 22 extend generally horizontally rearwardly therefrom to a position above the rear wheel 16. The second pair of brackets 24 is formed in substantially the same manner as the aforementioned first brackets 22 and extend from a position adjacent the rear hub 18 of the bicycle wheel 16 generally vertically upwardly to meet the end portion of the upper brackets 22 forming a generally 90° angle therewith. The lower end of the control rod 20 is mounted to the brackets 22,24 at the apex of the angle formed thereby, and extends outwardly therefrom. The brackets 22,24 are mounted to the bicycle using conventional bolts and nuts 28, while the guide rod 20 is mounted to the brackets 22,24 likewise using conventional bolts and nuts 28. As previously mentioned, the openings 19 formed in the guide rod 20 and the upper brackets 22 provide optional openings through which the bolts may be fitted to adjust the apparatus to fit most any conventional bicycle frame since most bicycle frames vary only in size and not in general configuration. Stops (not shown) are provided to limit the extent of the pivotal control rod 20 movement.

The two aforementioned connecting rods 50 are mounted at one end to the latch plate 42 of the auxiliary wheel assembly 30, as previously described, and are mounted at their other end to one of the openings 19 in the guide rod 20 using conventional bolts 28. The connecting rods 50 act to transfer forces imposed by movement of the guide rod 20 to the latch plate 42 and second bracket portion 36 to control the movement of the auxiliary wheel assembly 33 as will be explained in greater detail hereinafter.

Operation of the guide rod 20 is twofold. First, and with reference to FIG. 1, the guide rod may be gripped by an instructor S to impart direction and speed control forces to the bicycle. Since the guide rod is positioned in general alignment with the bicycle frame 12, the guide rod essentially becomes part of the frame, and forces imposed thereon are transmitted through the brackets to the frame in a controlled and balanced manner. Additionally, should the rider R on the bicycle lose control and begin to fall or collide with something, the instructor S has a safe and effective means of regaining control of the bicycle by gripping the guide rod and forcing the bicycle upright. Secondly, the control rod 20 controls the raising and lowering of the auxiliary wheels 32. With continued reference to FIG. 1, the auxiliary wheels 32 are shown in their lowered position with the guide rod 20 at its rearwardmost pivoted extent. Should the instructor S decide to raise the auxiliary wheels 32, the control rod 20 is thrust forwardly and caused to pivot about its mating point with the brackets 22,24. This forwardly arcuate movement of the guide rod 20 causes forward, arcuate movement of the connecting rod 50, providing upward movement of the end of the guide rod 50 attached to the latch plate 42.

Referring now to FIG. 2, upward movement of the connecting rod 50 causes the latch plate 42 to be pivoted about pivot pin 46 rearwardly with respect to the bicycle until it is out of a latching position holding the bracket portions 34,36 in their aligned position, whereby the second bracket portion 36 may be pivoted upwardly about the hinge 40 in relation to the first bracket portion 34. This pivotal motion of the second bracket portion 36 is also caused by the bias imposed thereon by the spring 52 extending between the connecting rod 50 and the second bracket portion 36, which tends to elongate upon upward movement of the connecting rod 50. The natural bias of the spring 52 imparts a generally upwardly directed force component on the second bracket portion 36, causing it to pivot upwardly, and the auxiliary wheel 32 to be raised to a position at which it is in spaced relation with the ground. As can be seen in FIG. 2, the control rod 20 may still be used for controlling and guiding movement while the auxiliary wheels 32 are in their raised disposition.

Figure 5:
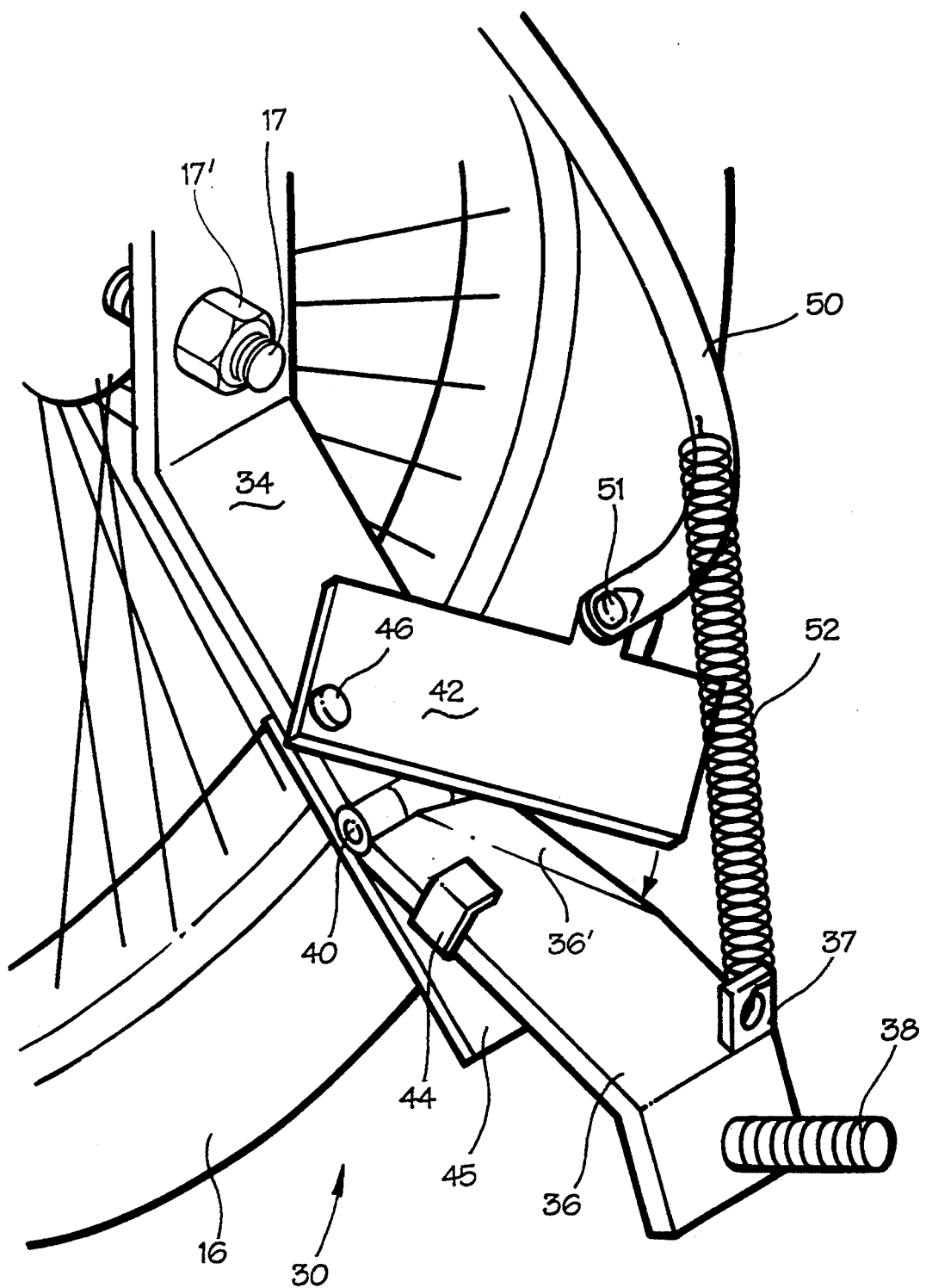
FIG. 5 is a detail view of the auxiliary wheel mechanism of FIG. 4 being moved to its lowered position.

To lower the wheels, the guide rod 20 is moved rearwardly as indicated by arrows in FIG. 2. With reference to FIG. 5, this movement causes the connecting rods 50 to be driven downwardly, in turn causing pivotal movement of the latch plate 42 forwardly with respect to the bicycle. Accordingly, the latch plate 42 is moved into abutment with the upturned second bracket portion 36. Since the second bracket portion 36 projects upwardly and outwardly with respect to the bicycle frame 12, and is pivotably mounted to the first bracket portion 34, the latch plate 42, which is aligned generally with the first bracket portion 34, tends to override the second bracket portion, directing it downwardly with a camming action. To enhance the camming action, a beveled surface 36' is formed as the second bracket portion 36 at the position where the latch plate 42 begins to override the second bracket portion 36. The beveled surface 36' helps to prevent binding of the latch plate 42 and the second bracket portion 36 by providing a relatively thin surface which is initially encountered by the latch plate 42, which increases in thickness to direct the latch plate 42 over the second bracket portion 36. As the pivotal movement continues, the camming action caused by the latch plate 42 overriding beveled surface 36' of the second bracket portion 36 continues to drive the second bracket portion 36 downwardly and ultimately into abutment with the backing plate 45 and into alignment with the first bracket portion 34 with the latch plate 42 in abutment with the stop member 44 and extending across the junction of the bracket portions 34,36 to maintain generally linear alignment thereof.

With regard to the operation of the apparatus, and in accordance with the method of the present invention, the control rod 20 is used generally to direct, stop, start, balance and generally control the bicycle operation and to selectively use the auxiliary support wheels 32. More specifically, and with reference to FIG. 1, the control rod 20 is used with the auxiliary wheels 32 in their lowered position for beginning riders. One of the earliest tasks facing the young rider is to acquire the ability to use the pedal-driven cranks to rotate the sprocket in a controlled manner for bicycle propulsion.

Typically, children will direct force downwardly on one pedal, causing the opposite pedal to be raised and will be unable to move the pedals through the transition region to where downwardly applied force on the other pedal causes continued forward motion rather than backward motion of the sprocket. By using the control rod 20 with the auxiliary wheels 32 in the lowered position, the instructor S can cause the bicycle to be propelled forwardly to allow the rider to experience proper pedal and crank movement so that this movement may be replicated in the absence of an instructor S, instilling in the rider R the necessary bicycle propulsion skills. Due to the positioning of the control rod 20, a smooth motion can be imparted to the bicycle, therefore increasing the child's confidence in his own ability to propel the bicycle. As the rider's skill level increases, the guide rod may be released and the bicycle operated without the influence of the instructor S in the manner of conventional training wheel equipped bicycles.

Referring now to FIG. 2, once the instructor has determined that the rider is acquiring sufficient balancing skills so that the auxiliary wheels 32 may no longer be necessary, the control rod 20 is caused to pivot forwardly from its position shown in FIG. 1, thereby raising the auxiliary wheels 32 in a manner previously described. While maintaining control of the bicycle using the control rod 20, the instructor S can sense the directional forces imposed on the bicycle by the rider and correct imbalances to maintain the rider R in an upright disposition and to further control and guide the bicycle, and can gain a sense of the rider's ability to control the bicycle in an upright and balanced manner. If, at any time, the instructor S feels that the rider R is unable to control the bicycle without benefit of the auxiliary wheels 32, the control rod 20 may be pivoted rearwardly to cause the auxiliary wheels 32 to move to their lowered position as previously described. This may be accomplished while the bicycle is still moving forwardly. The ability of the present invention to move the auxiliary wheels between a raised and lowered position under the control of the instructor S allows selective use of the auxiliary wheels 32 as long as they are needed. This prevents the situation, irritating to the instructor and frustrating to the rider, wherein the auxiliary wheels must be remounted to the bicycle after they have been removed.

Once the rider R has attained the level of balance and coordination wherein the auxiliary wheels 32 are no longer needed, the auxiliary wheel assembly 30 may be removed from the bicycle frame 12 along with the connecting rods 50 so that the control rod 20 may be used alone to guide and control bicycle movement during the final stage of riding instruction. Once the auxiliary wheel assembly 30 and the connecting rods 50 are removed, the bolts 28 holding the control rod 20 in a pivotable manner may be tightened so that the control rod 20 no longer pivots. The instructor can then selectively use the control rod 20 to further control and guide the movements of the bicycle until the rider has attained a level of skill wherein he can operate the bicycle without further guidance.

By the above, the present invention provides a method and apparatus for instructing a person to ride a bicycle wherein the instructor can interact with the rider in a balanced and coordinated manner to provide a safe and confidence-inspiring method for teaching someone to ride a bicycle. Further, it is contemplated that the guide rod 20 may be used by the rider himself to raise and lower the auxiliary wheels 32. By use of the above invention, the parent or instructor can act to impart proper balancing forces on the bicycle rather than react to a child's uncertain movements when learning to ride.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for bicycle riding instruction, said apparatus being mountable to a conventional bicycle frame and operable by a non-rider to guide and control the actions of the bicycle, said bicycle having a seat for rider support and being manually driven by a conventional rotary, pedal driven gear and chain drive centrally mounted to said frame, the pedals being rotatable through a vertically oriented circular plane having a forwardmost extent of pedal travel and a rewardmost extent of pedal travel with respect to the frame, said apparatus comprising:

an auxiliary wheel support assembly mounted to the bicycle frame adjacent the rear wheel of the bicycle, rearwardly of the rearwardmost extent of pedal travel, and having at least two wheels mounted thereto, said support assembly having an arrangement for selectively controlled movement between a first, lowered position at which said auxiliary wheels are closely adjacent the ground for helping to maintain the bicycle in an upright disposition and a second, raised position at which said wheels are spaced from the ground sufficiently to have no effect in keeping the bicycle in an upright disposition; and a control arrangement connected to said support assembly and said bicycle frame, said control arrangement projecting from said bicycle frame beyond the generally horizontal plane of the bicycle seat for operational access by a non-rider when said bicycle is in motion and being operable to selectively move said auxiliary wheel support assembly between said first and second positions and to control the actions of the bicycle.

2. An apparatus for bicycle riding instruction according to claim 1 wherein said control arrangement includes a generally rod-like member pivotably mounted to the bicycle frame rearwardly of the seat and projecting outwardly therefrom, said rod member being operably connected to said auxiliary wheel support assembly, said auxiliary wheel support assembly being movable between said first and second positions responsive to movement of said rod member.

3. An apparatus for bicycle riding instruction according to claim 2 wherein said guide rod is pivotable between a first predetermined position wherein said auxiliary wheels are in said lowered position and a second predetermined position wherein said auxiliary wheels are in said raised position.

4. An apparatus for bicycle riding instruction according to claim 3 wherein said first predetermined position is rearwardly of said second predetermined position.

5. An apparatus for bicycle riding instruction according to claim 4 wherein said rod member has a hand grip mounted to the outward end thereof for gripping by a non-rider to control the actions of a bicycle.

6. An apparatus for bicycle riding instruction according to claim 2 wherein said auxiliary wheel support assembly includes means for removably mounting said support assembly to said bicycle frame independently of said rod member for using said rod member to control the actions of the bicycle without the influence of said auxiliary wheels, said rod member being fixable to said frame in a non-movable manner.

7. An apparatus for bicycle riding instruction according to claim 1 wherein said auxiliary wheel support assembly includes a mounting bracket having a first portion mountable to a bicycle frame to project outwardly therefrom and a second portion, hingedly mounted to said first portion and projecting outwardly therefrom, having said auxiliary wheel mounted thereon, and being selectively pivotable generally upwardly relative to said second bracket portion.

8. An apparatus for bicycle riding instruction according to claim 7 wherein said first bracket portion is selectively pivotable in response to operation of said control arrangement.

9. An apparatus for bicycle riding instruction according to claim 8 wherein said control arrangement includes a generally rod-like member pivotably mounted to the bicycle frame rearwardly of the seat and projecting outwardly therefrom, said rod member being operably connected to said second bracket portion, said second bracket portion being movable for moving said auxiliary wheel assembly between said first and second positions in response to movement of said rod member.

10. An apparatus for bicycle riding instruction according to claim 9 wherein said auxiliary wheel mounting assembly further includes a latching arrangement to selectively retain said first bracket portion in a non-movable disposition.

11. An apparatus for bicycle riding instruction according to claim 10 wherein said latching arrangement includes a generally planar latch plate pivotably mounted to said first bracket portion and configured to extend between said first bracket portion and said second bracket portion to selectively prevent said upward movement of said second bracket portion, said latch plate being connected to said rod member and movable in response to movement thereof.

12. An apparatus for bicycle riding instruction according to claim 11 wherein movement of said rod member causes said latch plate to move away from said second bracket portion and further causes said second bracket portion, and thereby said auxiliary wheel attached thereto, to move upwardly relative to said first bracket portion.

13. A method for instructing a person, preferably a child, to ride a bicycle wherein a non-rider, preferably an adult, interacts with the rider to provide support, guidance and control of bicycle movements, said method comprising:

mounting an auxiliary wheel support assembly having at least two auxiliary wheels mounted thereto on the bicycle frame for selectively controlled movement between a first, lowered position adjacent the ground and a second raised position spaced from the ground;

providing a control arrangement mounted to the bicycle frame for selectively controlling the movement of said auxiliary wheels between said first and second positions and to selectively control the actions of the bicycle in support of the rider;

controlling and guiding the actions of the bicycle using said control means with said wheels in said first lowered position;

moving said auxiliary wheels to said second raised position while the bicycle is in motion responsive to apparent rider skills indicating sufficient operative bicycle riding skills relative to operation of the bicycle in an upright disposition; and controlling and guiding the actions of the bicycle using said control means with said auxiliary wheels in said second, raised position.

14. A method for instructing a person, preferably a child, to ride a bicycle according to claim 13 and further comprising the steps of:

removing said auxiliary wheels while retaining said control arrangement responsive to apparent rider skill; and controlling and guiding the actions of the bicycle using said control means with said auxiliary wheels removed from the bicycle frame.

15. A method for instructing a person, preferably a child, to ride a bicycle according to claim 13 and further comprising the step of moving said auxiliary wheels to said first, lowered position responsive to apparent rider skills indicating insufficient operative bicycle riding skills relative to operation of the bicycle in an upright disposition.

* * * * *